No. 648,173. Patented Apr. 24, 1900.
E. B. MEYROWITZ.
OPHTHALMOMETER.
(Application filed Feb. 23, 1899.)

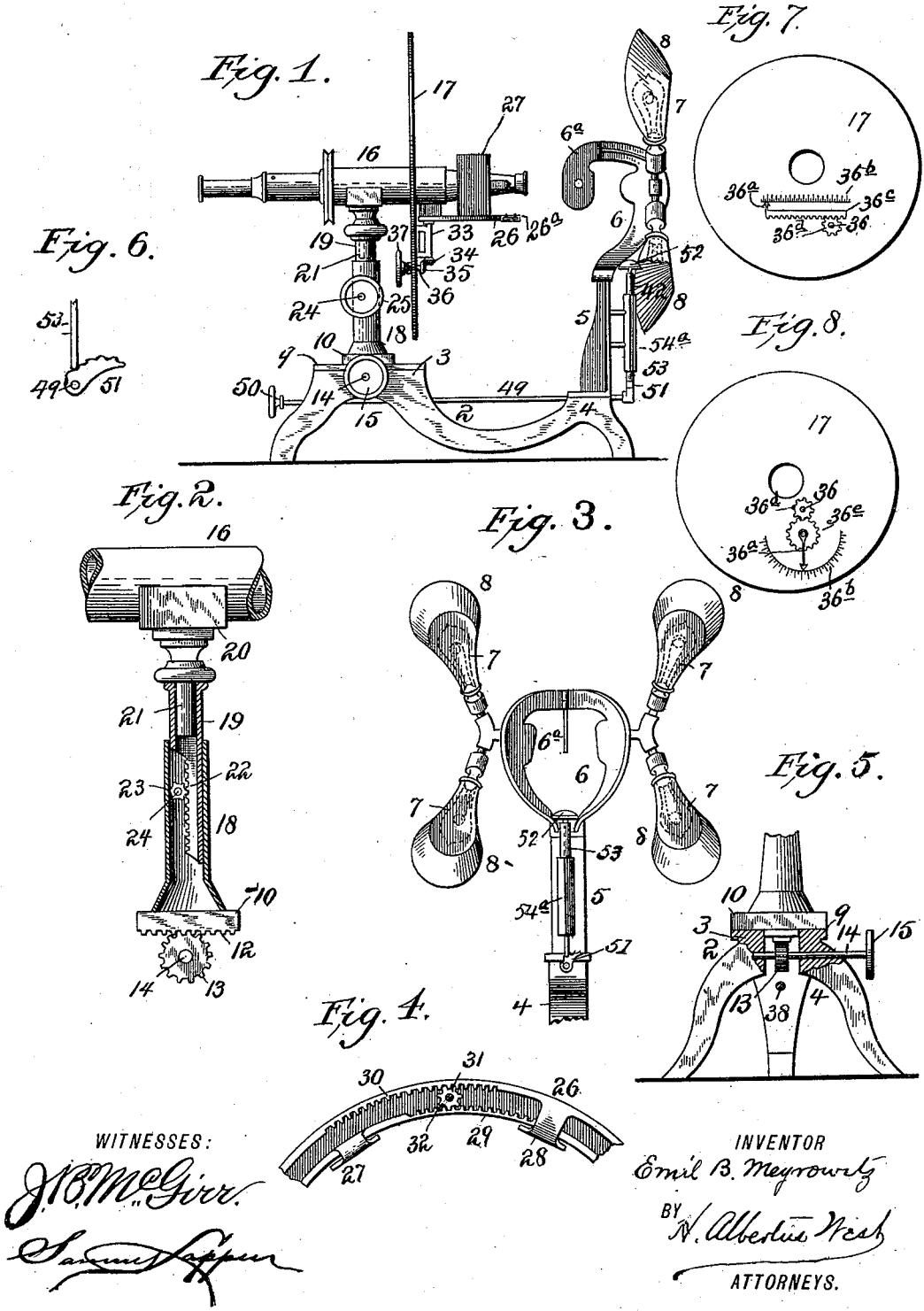

(No Model.) 2 Sheets—Sheet 2.

WITNESSES:
J. B. McGirr.
Samuel Lappin

INVENTOR
Emil B. Meyrowitz
BY H. Albertus West
ATTORNEYS.

UNITED STATES PATENT OFFICE.

EMIL B. MEYROWITZ, OF NEW YORK, N. Y.

OPHTHALMOMETER.

SPECIFICATION forming part of Letters Patent No. 648,173, dated April 24, 1900.

Application filed February 23, 1899. Serial No. 706,616. (No model.)

*To all whom it may concern:*

Be it known that I, EMIL B. MEYROWITZ, a citizen of the United States, and a resident of New York, in the county of New York and State of New York, have invented certain new and useful Improvements in Ophthalmometers, of which the following is a specification.

Figure 11:
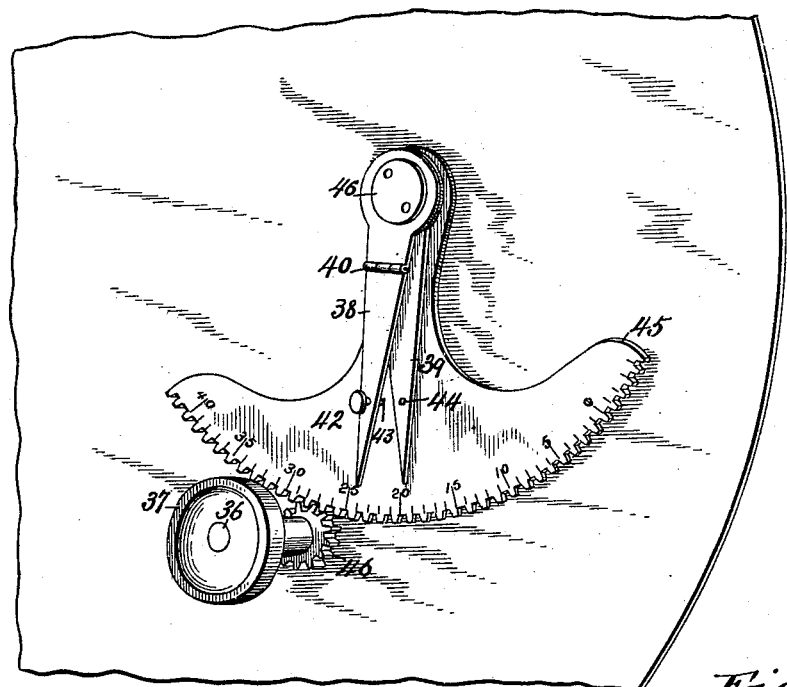
Figures 9, 10:
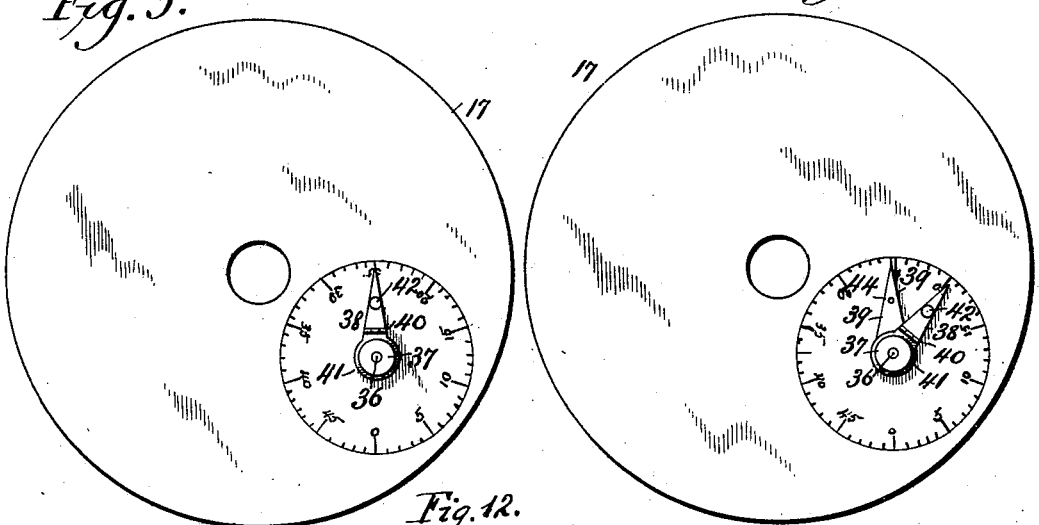
Figure 12:
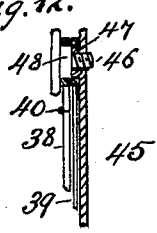

In the accompanying drawings, to which reference is made and which form a part of this specification, Figure 1 is a side elevation of an ophthalmometer made in accordance with my invention. Fig. 2 is a detailed sectional view of a portion of the telescope and its standard removed from the base or frame of the apparatus. Fig. 3 is a detailed view of the face-frame, chin-rest, reflectors, &c. Fig. 4 is a detailed view of the arc and mires and a portion of the means for adjusting them. Fig. 5 is a detailed rear elevation of the stand, telescope-support, and means for adjusting the same. Fig. 6 is a detail view, showing the adjusting device. Figs. 7 and 8 are elevations of the dial, showing the index thereon. Figs. 9, 10, and 11 are enlarged views showing modified forms of index mechanism, and Fig. 12 is a sectional view showing the movable index and the pointers of Fig. 11.

The base or frame 2 of my new ophthalmometer is constructed to form a flat table 3 and stand 4, to which latter is firmly secured an upright 5, which supports the face-frame 6, lights 7, reflectors 8, and hinged eye-shield $6^a$. The table 3 is formed or provided with a channel piece or plate 9, on which the footpiece 10 of the telescope-standard rests and on which it is adapted to be adjusted forward and back by suitable means, preferably the rack 12 on the bottom of the footpiece 10, pinion 13, shaft 14, and crank or milled head 15. The shaft 14 is journaled in bearings formed in the main frame 2 and is independent of the footpiece of the standard which supports the telescope 16 and the disk or dial 17—that is, the telescope and its movable standard are operatively independent of the means employed for adjusting or moving the same back and forth on the way 3 in focusing the telescope.

The standard for the telescope is composed of sections 18 19, preferably two telescoping tubes, and a saddle 20, the stud 21 of which is adapted to turn in the section or tube 19 to allow the telescope to be turned horizontally on a vertical axis. The vertical adjustment of the telescope is effected by rack 22 and pinion 23 on shaft 24, provided with a crank or milled nut 25, the said shaft being in this instance journaled in the lower section or tube 18, as shown.

The disk 17 is supported by the telescope, and connected to the disk and by preference also to the telescope is the graduated arc 26, which is provided with the mires 27 and 28. The mire 27 is connected to a rack 29, and mire 28 is connected to an opposite rack 30, both of which racks slide freely between marginal retainers or flanges on the arc. A pinion 31 is interposed between the said racks to operate both simultaneously. The said pinion is secure on a small shaft 32, held in a sleeve or bearing 33, secured to the disk 17, and the lower end of the said shaft is provided with a beveled gear 34, with which another beveled gear 35 meshes, the latter being secured to a shaft 36, which passes through the disk 17 and is provided with a crank or milled nut 37 back of the disk 17, so that the user may easily adjust the mires without removing his eye from the telescope. The shaft 36 operates a pointer $36^a$ along a scale $36^b$ at the back of the disk 17, thereby registering and indicating the position of the mires. In Fig. 7 the pointer $36^a$ is carried by a sliding rack-bar $36^c$ and pinion $36^d$, while in Fig. 8 it is carried on the shaft of a gear-wheel $36^e$. In the form shown in Figs. 9 and 10 I employ two index-fingers 38 and 39. The index-finger 38 is hinged at 40 to a plate or ring 41, which is connected to turn with the shaft 36 and knob 37, and the said hinged part is provided with a small knob 42, which projects through the pointer and forms a small point or pin 43, (see Fig. 11,) adapted to enter a small orifice or detent 44 in the pointer 39, so that when desired the movement of the pointer 38 will carry the pointer 39 with it; but when the pointer 38 is turned back on its hinge the pointer 39 will remain stationary no matter how much the knob 37 may be turned.

In use the optician will first close the two pointers together and make the primary adjustment of the mires. This will be registered by the two pointers operating as one pointer. This done he will swing the pointer 44 back on its hinge and let it remain in that condition during the secondary adjustment of the mires. When the mires have been brought to the exact position, the optician will turn the pointer 38 up against index, as shown in Fig. 10, so that in reality three readings are given on the dial—to wit, that of the pointer 38, that of the pointer 39, and the degrees between the two pointers.

In Figs. 11 and 12 instead of using an index marked upon or secured to the back of the plate 17 I mark the index on a segment 45, which is toothed at its curved edge to mesh with a pinion 46 on the shaft 36. The said segment 45 is pivoted on a stud 46, adapted to be screwed into the back of the disk 17. With the said segment I employ two pointers, preferably the same as the pointers 38 39. (Shown in Figs. 9 and 10.) The pointer 39 is mounted on a collar 47, formed on the segment 45 to move with the segment, while the pointer 38 is mounted on a base 48 on the stud 46, so that said pointer will remain at rest when not coupled with the pointer 39. When the knob 37 is turned to adjust the mires, the segment is moved correspondingly, and during the primary adjustment the pointers will be coupled together. Then the pointer 38 will be disengaged from the pointer 39 while the mires are being brought to secondary position, and when this is done the pointer 38 will be pressed back, and thus give the desired reading.

49 represents a shaft journaled in bearings in the main frame 2. Its rear end is provided with a crank or milled nut 50, while its front end is provided with an adjusting device 51 for raising and lowering the chin-rest 52, which is attached to a rod 53, held in the sleeve 54ª. The rod 53, which carries the chin-rest 52, is in line with the shaft 49—that is, immediately above it—and the adjuster 51 is a curved arm, the operating edge of which is formed with a series of scallops 54, each of which is a separate lifting-cam, and a rest or support for the lower end of the chin-rest rod, so that by turning the rod 49 the chin-rest may be raised or lowered step by step, and each of said steps as it comes into action not only raises or lowers the chin-rest, but by coming vertically into line between the shaft 49 and the chin-rest rod operates in conjunction with the rod to automatically hold the parts in position until the shaft is again turned to the right or left by the user.

Having thus described my invention, what I claim as new, and desire to secure by Letters Patent, is—

1. In an ophthalmometer a standard having a base provided with a rack, a telescope mounted on said standard, and a main frame provided with a horizontal table, in combination with a pinion for moving the standard back and forth on said table, substantially as and for the purposes described.

2. In an ophthalmometer a telescope mounted on a standard, a disk mounted on the telescope, an arc provided with mires, a shaft passed through said disk and means operating between said shaft and the mires for adjusting the latter, substantially as described.

3. In an ophthalmometer, the disk having an index at the back thereof and mires at the front thereof, and a shaft passed through the disk for moving the mires combined with a pointer for registering the position of the mires on the said index, substantially as described.

4. In an ophthalmometer a rotating disk, an index at the back thereof and mires at the front thereof, and a shaft passed through the disk for moving the mires, in combination with two pointers, one attached to the shaft the other adapted to be coupled with the said first-named pointer, substantially as described.

5. In an ophthalmometer a rotating disk, a shaft passed through said disk and mires at the front of said disk adapted to be adjusted by said shaft, in combination with pointers and an index-segment at the back of said disk geared to the said shaft, substantially as described.

6. In an ophthalmometer a rotating disk, a shaft passed through said disk and mires at the front of said disk adapted to be adjusted by said shaft, in combination with an index-segment at the back of the said disk geared to the said shaft, a pointer adapted to move with said segment, and another independent pointer adapted to be coupled with the first-named pointer, substantially as described.

7. In an ophthalmometer the vertically-adjustable chin-rest rod or support, a shaft held in the frame beneath said support and an adjusting device for said chin-rest secured to said shaft and formed with a series of cams and steps, each to operate between said shaft and chin-rest, substantially as described.

EMIL B. MEYROWITZ.

Witnesses:
O. N. MEYROWITZ,
JEAN SCHMIDT.